(12) United States Patent
Golic

(10) Patent No.: US 9,754,128 B2
(45) Date of Patent: Sep. 5, 2017

(54) DYNAMIC PSEUDONYMIZATION METHOD FOR USER DATA PROFILING NETWORKS AND USER DATA PROFILING NETWORK IMPLEMENTING THE METHOD

(75) Inventor: Jovan Golic, Turin (IT)

(73) Assignee: TELECOM ITALIA S.p.A., Milan (IT)

( * ) Notice: Subject to any disclaimer, the term of this patent is extended or adjusted under 35 U.S.C. 154(b) by 300 days.

(21) Appl. No.: 14/368,585

(22) PCT Filed: Dec. 27, 2011

(86) PCT No.: PCT/EP2011/074102
§ 371 (c)(1),
(2), (4) Date: Jun. 25, 2014

(87) PCT Pub. No.: WO2013/097886
PCT Pub. Date: Jul. 4, 2013

(65) Prior Publication Data
US 2014/0359782 A1    Dec. 4, 2014

(51) Int. Cl.
*G06F 7/04* (2006.01)
*G06F 21/62* (2013.01)
(Continued)

(52) U.S. Cl.
CPC ...... *G06F 21/6254* (2013.01); *H04L 63/0407* (2013.01); *G06F 21/10* (2013.01); *H04L 63/08* (2013.01)

(58) Field of Classification Search
CPC ..... H04L 63/08; H04L 63/10; H04L 63/0407; G06F 21/10; G06F 21/31; G06F 21/6554;
(Continued)

(56) References Cited

U.S. PATENT DOCUMENTS

| 6,029,195 A | 2/2000 | Herz |
| 7,207,058 B2* | 4/2007 | Barrett ............ G06F 21/33 |
| | | 705/51 |

(Continued)

FOREIGN PATENT DOCUMENTS

WO    01 60083    8/2001

OTHER PUBLICATIONS

Riedl, B. et al. "A secure architecture for the pseudonymization of medical data" IEEE, Second International Conference on Availability, Reliability and Security (ARES'07), pp. 318-324, 2007 XP 031079601.
(Continued)

*Primary Examiner* — Ali Abyaneh
*Assistant Examiner* — Shaqueal Wade
(74) *Attorney, Agent, or Firm* — Oblon, McClelland, Maier & Neustadt, L.L.P.

(57) ABSTRACT

A users' data profiling network implementing a method of dynamic pseudonymization of users for ensuring user privacy, including: receiving at a data node new input data related to a user along with an associated new user pseudonym and an old user pseudonym; in the data node, finding user data record, corresponding to the received new input data, having stored therein a dynamic input user pseudonym equal to the old user pseudonym received together with the new input data or to one user pseudonym; temporarily storing, in the found user data record, the new input data; setting the dynamic input user pseudonym stored in the user data record equal to the last received new user pseudonym associated with the received input data related to the user; computing and storing an output user data profile in the user data record, and then erasing accumulated new input data from the user data record.

14 Claims, 3 Drawing Sheets

(51) Int. Cl.
*G06F 21/10* (2013.01)
*H04L 29/06* (2006.01)
(58) Field of Classification Search
CPC .................... G06F 19/30; G06F 19/32; G06F 19/322–19/324; G06F 19/327; G11B 20/0086
See application file for complete search history.

(56) References Cited

U.S. PATENT DOCUMENTS

| | | | |
|---|---|---|---|
| 7,213,032 B2 * | 5/2007 | Mascarenhas | G06Q 30/02 707/781 |
| 8,219,752 B1 * | 7/2012 | Jenkins | G06F 12/0815 711/118 |
| 9,135,348 B2 * | 9/2015 | Wu | G06F 17/30702 |
| 2001/0036224 A1 | 11/2001 | Demello et al. | |
| 2002/0095399 A1 * | 7/2002 | Devine | G06F 17/3089 |

OTHER PUBLICATIONS

Clauss, S. et al. "Privacy Enhancing Identity Management: Protection Against Re-identification and Profiling" ACM, pp. 84-93, Nov. 11, 2005 XP 040031729.
International Search Report Issued Oct. 17, 2012 in PCT/EP11/074102 Filed Dec. 27, 2011.
Written Opinion of the International Searching Authority Issued Oct. 17, 2012 in PCT/EP11/074102 Filed Dec. 27, 2011.

* cited by examiner

DYNAMIC PSEUDONYMIZATION METHOD FOR USER DATA PROFILING NETWORKS AND USER DATA PROFILING NETWORK IMPLEMENTING THE METHOD

BACKGROUND OF THE INVENTION

Technical Field of the Invention

The present invention relates to privacy and anonymization in computer networks, and particularly to pseudonymization methods able of providing anonymity of sensitive data, such as user data profiles, that are stored in computer networks.

Overview of the Related Art

Pseudonymization techniques can be used to provide privacy of sensitive data in data profiling networks, wherein data is dynamically acquired from various data sources and then processed, stored, and retrieved, over a period of time. Typically, a data profiling network is implemented as a computer network. Each data source provides data originating from or relating to different real-world entities called "users". For example, users may be individuals (persons) or groups of persons, companies, organizations, Internet websites, or devices such as personal computers and mobile phones. Privacy implies that the real-world identities of users should remain hidden from the network nodes processing and storing the sensitive data. In the context of the present description and for the purposes of the present invention, a "real-world identity" of a user is defined as a set of identifiers, wherein each identifier is a description of a verifiable physical or logical property of a user, which is assumed to be valid over a period of time. A real-world identity is a unique representation of a single user or a relatively small set of users within a global domain (e.g., the world or a state) or a local domain (e.g., a company or a town).

For example, a data profiling network may be set up for on-line profiling by internet service providers (ISPs) or particular websites providing various internet services. The data profile then relates to the Internet usage by individual users and is meant to be used for providing improved or new services over the Internet, e.g., for targeted marketing by authorized entities via customized banner advertisements. In this case, the real-world identity of a user to be protected may include as identifiers, for example, a Uniform Resource Locator (URL), an email address, an IP address, a phone number, a person's name, or a residential address.

In order to derive cumulative data profiles in time for any particular user, it is intrinsically required to link together different data relating to the same user at different times. In essence, this linkability is constrained in that it relates only to the data needed for computing the data profile at a given time and not necessarily to the data profiles at different times. In order to ensure this constrained linkability, a conventional method consists in using a static pseudonym (hereinafter, a pseudonym will be also referred to as PID) in place of an identity (hereinafter also referred to as ID), where the associations between IDs and PIDs should remain hidden from the network nodes processing and storing the sensitive data.

The main problem with using static pseudonyms is that the provided linkability is unconstrained, as it is unlimited in time and also relates to the data profiles of a user at different times. The unconstrained linkability means that the data profiles at different times are linked together by the same static pseudonym and can hence be used to obtain the data profile curves in time for any targeted user, regardless of how the data profile changes in time. As a consequence, the unconstrained linkability deriving from the use of static pseudonyms results in the lack of forward/backward privacy and increases the risk of the user identity recovery by analyzing the data profile curves. No or scarce forward/backward privacy means that if the identity of a user is compromised at a given time, then the corresponding data profiles in the past and in the future are all compromised, which itself results in the full traceability of the identified user.

Since a data profile curve contains much more information than a single data profile at a given time, the risk of having someone able to recover the identity of the corresponding user increases significantly, depending on the data profile, especially if it is possible to correlate the data profile curve with real-life data. In general, this risk is thus much higher than in the case of using data profiles at single times only.

U.S. Pat. No. 7,213,032 B2 describes a computer-implemented method and system for anonymous profiling of, and targeted marketing to, anonymous users in a data network, such as the Internet. Data network is divided into three parts: the anonymous trusted part (ATP), non-anonymous part (NAP), and non-profiling part (NPP). The anonymous user profiles are computed, maintained, and used in ATP, the non-anonymous transactions requiring real-world user identities are executed within NAP, and the anonymous user profiles taken from ATP are also used within NPP. The anonymity of user profiles is ensured by assigning a unique identifier (UID) to each user in ATP and a possibly different UID in NPP. The user profiles labeled by UID are stored in a database of ATP. Users are anonymously authenticated in ATP or NPP by using self-chosen virtual user names or pseudonyms together with passwords when logging into the system. The central point of U.S. Pat. No. 7,213,032 B2 is that the user real-world identity is only used in NAP and is never revealed to any part of ATP or NPP, while the user profiles are never explicitly used in NAP. However, it is allowed that so-called "representational or tokenized transactional values" can traverse the boundary between NAP on one hand and ATP and NPP on the other. Such values are defined as "any coded information that can be generated or redeemed by a user and contains neither user profile nor user real-world identity". Such values have an important role to connect the anonymous and non-anonymous parts of the network and thus enable the non-anonymous transactions within NAP.

U.S. Pat. No. 7,844,717 B2 discloses a method for pseudonymous exchange of private personal data associated with users between two or more data storage servers or within a single data storage server, where the privacy of users and data storage servers is protected by using pseudonyms instead of real-world identities. In the system, the users and servers are authenticated by standard methods using validated secure pseudonyms and credentials (in particular, the method from D. Chaum and J.-H. Evertse, "A secure and privacy-protecting protocol for transmitting personal information between organizations," in Proceedings of Crypto '86, *Lecture Notes in Computer Science*, vol. 263, pp. 118-167, 1987).

The central point of the method is the usage of a trusted proxy server called the pseudonym server for controlling the access to private data via access control rules, in which the users and servers are registered and represented by the associated unique identifiers (UIDs) along with user and server types, respectively. The user real-world identities can be stored too.

U.S. Pat. No. 7,610,390 B2 describes a method for linking user accounts stored at different nodes in a data network such as the Internet, where each user account contains some locally unique user account identity information (ID), composed of locally chosen, possibly partial, real-world identifiers (which should be regarded as private if they uniquely specify the user) or arbitrarily chosen local user account names, auxiliary information composed of the so-called handles, and, possibly, other private data (e.g., user profiles, preferences, policies, services authorized to have access to, access control rights, etc.). There are two basic types of nodes, called identity providers and service providers. The main role of the former is to authenticate the users and, hence, the stored local IDs necessarily include real-world identifiers. The main role of the latter is to provide various services and, hence, may or may not include real-world identifiers as parts of the stored local IDs.

The service and identity nodes interact with each other and thus provide different services to network users. This interaction requires that the user accounts stored at different nodes be linked together. The role of the handles is to enable this linking without exchanging the local user account IDs. This is achieved by having the same handle being shared (as a common secret) by the two nodes communicating to each other. The same shared handle thus determines that the two user accounts correspond to the same user. Each handle corresponding to a user consists of two parts, which are respectively generated by the two nodes and sent to each other, in a possibly encrypted form. If the same node communicates to several other nodes, then the part of the handle generated by that node is the same for all the connections, i.e., it depends on the local user account rather than on the connection. In this sense, it can be called a pseudonym of the local user account at a given node. A pair of pseudonyms associated with two nodes thus determines, as a handle, the connection between the user accounts, of the same user, at the two nodes. It is further suggested that by choosing dynamic pseudonyms, i.e., the pseudonyms that change in time, "the visibility of the account name can be reduced".

The paper of S. Fouladgar and H. Afifi, "A simple privacy protecting scheme enabling delegation and ownership transfer for RFID tags," *Journal of Communications*, vol. 2, no. 6, pp. 6-13, 2007, deals with a communication protocol for mutual authentication in a system composed of RFID (radio frequency identification) tags and tag readers via a trusted on-line database. The protocol is of a challenge-response type using dynamic pseudonyms for tag authentication, where the pseudonyms are generated from pre-shared secret keys and counter-generated local nonces by using cryptographic hash or encryption functions. The tags IDs and secret keys are stored in the trusted on-line database and are only revealed by the protocol to authorized readers, while the dynamic pseudonyms ensure that the tag authentication remains untraceable by unauthorized readers.

SUMMARY OF THE INVENTION

In connection with U.S. Pat. No. 7,213,032 B2, the Applicant observes that, in spite of their importance for the disclosed method, the definition and role of the so-called "representational or tokenized transactional values" remain rather vague and unclear. The Applicant also observes that the user UIDs have the role of unique static pseudonyms associated with users and user profiles and that the required logical or physical separation of NAP should ensure that the user UIDs are never stored in user equipment and can never be linked with user real-world identities through any information associated with the users (e.g., through IP addresses of user equipment on the Internet). This may be difficult to implement given the wide usage of user UIDs in ATP and NPP. In any case, as explained above, the usage of static pseudonyms results in the undesired unconstrained time linkability of user profiles.

In connection with U.S. Pat. No. 7,844,717 B2, the Applicant observes that UIDs have the role of unique static pseudonyms associated with the involved entities and, hence, result in the unconstrained time linkability of the private data exchanges. In addition, if static pseudonyms are used for representing the private data stored at individual data servers, then the resulting unconstrained linkability in time of this private data may be undesirable in many applications.

In connection with U.S. Pat. No. 7,610,390 B2, the Applicant observes that the main claims of U.S. Pat. No. 7,610,390 B2 (independent Claims 1, 5, and 12) are flawed, because they do not specify how the node that is the first to receive the part of the handle sent from the other node determines the user account this part of the handle should be associated to. Namely, the user account IDs are not transmitted and without some common information specifying the user account, the parts of the handle cannot be shared, i.e., the initial linking cannot be established. For the same reason, dynamically generated parts of the already existing handle cannot be shared in the way specified by the claims. By examining the text of U.S. Pat. No. 7,610,390 B2, the Applicant found that the authors may have assumed that the required linking (both initially and later when the locally generated parts of the handle are changed) can be established by using, for each pair of nodes, either simultaneous presence of the user at both nodes via a common IP address or storage for the parts of the handle in the same user equipment used for accessing both the nodes (e.g., in a form of a cookie via user Internet browser). The Applicant observes that in the latter case it is necessary to perform user authentication at both the nodes, and not only at one of the nodes, as specified by Claims 5 and 12. This is because the cookies cannot be regarded as authentic (even when encrypted, due to replay attacks).

Another observation of the Applicant is that in spite of the proposed dynamically generated parts of the handle, each user account, with all the private data stored, is linkable in time at each node, where the linkability is determined by same stored user account ID as well as by the stored unchanged part or parts of the handle. Yet another drawback of the method, as observed by the Applicant, is that it does not provide privacy of stored private data unless there is full trust in each of the identity providers. Namely, compromised user accounts of an identity provider would enable linking the corresponding user account IDs to private data stored at other nodes connected to this provider. However, having this trust seems to be unrealistic in the distributed scenario.

The Applicant has dealt with the problem of designing a method for dynamic pseudonymization of users for data profiling networks that provides data anonymity by using dynamic pseudonyms that change in time in order to prevent unconstrained linkability of data profiles, which, as discussed above, is inherent to the conventional static pseudonymization method and is disadvantageous for the reasons discussed in the foregoing. The method of the present invention works in the general case of data profiling nodes (hereinafter, for conciseness also referred to as "data nodes")

of a data profiling network, wherein the data profiling nodes receive pseudonymized inputs from multiple data sources or other data profiling nodes.

The Applicant has observed that a data profiling network composed of data nodes can be synchronized to work with dynamically pseudonymized data, with each pseudonym changing in time randomly or pseudorandomly or as a keyed function of the respective identity where the key varies in time. The method according to the present invention enables each data node in the data profiling network to find the right data record corresponding to dynamically pseudonymized input data, to process the respective input data into output data, to assign a dynamic pseudonym to the output data, and to send dynamically pseudonymized output data to other data nodes in the data profiling network. Access to stored user data profiles by authorized entities is enabled by utilizing user identities or user pseudonyms.

The method of the present invention can also be applicable to combined data profiling networks, i.e., data profiling networks composed of disjoint data nodes, but possibly sharing the same users. In one embodiment, the method of the present invention enables exchanging individual user data profiles corresponding to a same user in different data profiling networks. In another embodiment, the method of the present invention enables aggregation of user data profiles corresponding to specified sets of users (possibly all of them) in different data profiling networks.

According to an aspect of the present invention, there is provided a dynamic pseudonymization method for a data profiling network comprising at least one data node configured for receiving input data related to users and transforming said input data into output user data profile related to users, said data node comprising user data records for storing input data related to users together with dynamic input pseudonyms of the users, said data node being configured for computing said output user data profile related to a user from said input data and for storing the computed output data profiles in said user data records thereof. The method comprises:

receiving at the data node new input data related to a user along with an associated new user pseudonym and an old user pseudonym that was associated with previously received input data related to the user in the past or a set of candidate old user pseudonyms;

in said data node, finding the user data record corresponding to the received new input data as the user data record having stored therein a dynamic input user pseudonym equal to said old user pseudonym received together with said new input data or to one user pseudonym belonging to the received set of candidate old user pseudonyms;

temporarily storing, in the found user data record, the new input data;

setting the dynamic input user pseudonym stored in said user data record of said data node equal to the last received new user pseudonym associated with the received input data related to the user;

computing at times said output user data profile by using new input data accumulated in the user data record, storing the computed output user data profile in the user data record, and then erasing said accumulated new input data from the user data record.

In an embodiment of the invention the method may comprise:

in said data node, generating and storing in said user data record a dynamic output user pseudonym together with said computed output user data profile;

sending at times said output user data profile to at least one other data node in said data profiling network, each time generating a new value of said dynamic output user pseudonym, substituting said new value of said dynamic output user pseudonym for a previously stored old value of said dynamic output user pseudonym, and sending to said at least one other data node both the old and the new values of said dynamic output user pseudonym together with said output user data profile.

Said input data may be received by the data node from at least one data source node of the data profiling network, or from at least one other data node of the data profiling network.

In an embodiment of the invention the method may comprise:

providing, in said data profiling network, at least one pseudonymization node operable to:
  receive from the at least one data source node user identities, said user identities identifying the user in said data source, the user identities comprising one or more identifiers of the users known to the data source;
  generate user pseudonyms from the received user identities;
  provide to the data source node the generated user pseudonyms.

Said user pseudonyms may be generated as random or pseudorandom values, or keyed values generated by a keyed function from user identities and a secret key.

Said pseudonymization node may be operable to encrypt and authenticate the generated user pseudonyms to be provided to the data source node.

The generated random or pseudorandom user pseudonyms may be stored at the pseudonymization node in association with the corresponding user identities.

The user identities may be different for different data source nodes. The method may comprise providing, in said data profiling network, at least one equivalent user identities managing node operable to manage as equivalents different identities of a same user corresponding to different data sources.

In an embodiment of the invention the method may comprise:

upon receiving, at said data node, new input data related to a user from the at least one data source or from the at least one other data node, if no user data record is found that includes the said old user pseudonym received along with the new input data or one user pseudonym belonging to the said set of candidate old user pseudonyms received along with the new input data, having the data node ascertaining, by exploiting the said old user pseudonym or the said set of candidate old user pseudonyms received along with the new input data, whether a user data record in respect of that user already exists, wherein said user data record has been created for storing input data related to that user received from at least one other data source in the past.

In case the new input data is received by said data node from the at least one data source, said ascertaining may comprise:

having the said data node send backwards a request to the said at least one data source for obtaining equivalent pseudonyms of the user, said request containing the said old user pseudonym or the said set of candidate old user pseudonyms;

having the said at least one data source recover the user identity temporarily stored therein, send the recovered user identity to the equivalent user identities managing node, and request to said equivalent user identities managing node to provide the equivalent identities of the user to the pseudonymization node;

having the pseudonymization node retrieve the equivalent pseudonyms of the user and then send them to the data source nodes connected thereto;

performing a forward flooding process comprising:

having the data source nodes connected to the pseudonymization node send forwards to all the data nodes connected thereto requests that contain the received equivalent pseudonyms of the user;

when a data node in said data profiling network receives at its inputs one or more requests that contain equivalent pseudonyms from at least one other data node connected thereto, having the data node search for the user data record storing one of the received equivalent pseudonyms as input user pseudonyms;

if such user data record is found and the data node is the said data node receiving the new input data, having the data node use the found user data record for storing the received new input data;

if such user data record is found and the data node is different from the said data node receiving the new input data, having the data node continue the forward flooding process by sending forwards the output user pseudonyms stored in the user data record to all the other data nodes connected to its outputs.

In case the new input data is received by said data node from the at least one other data node, said ascertaining may comprise performing a backtracking process, an equivalent pseudonyms recovery process, and a forward flooding process, where:

the said backtracking process comprises:

having the said data node send backwards a request to the said at least one other data node for obtaining equivalent pseudonyms of the user, said request containing the said old user pseudonym or the said set of candidate old user pseudonyms;

having the said at least one other data node search for the user data record storing one of the received old user pseudonyms as output user pseudonym and then send backwards at least one request to any other data nodes connected to its inputs, said request containing the input user pseudonym stored in the user data record;

when a data node in said data profiling network receives at any of its outputs a request from any other data node connected thereto, having the data node search for the user data record storing the received user pseudonym as output user pseudonym and then send backwards at least one request to any of other data nodes or any of data source nodes connected to its inputs, said request containing the input user pseudonym stored in the user data record;

when a data source node in said data profiling network receives at its output a request from any data node connected thereto, having the data source forward the received user pseudonym to the pseudonymization node with a request to provide the equivalent pseudonyms of the user;

the said equivalent pseudonyms recovery process comprises:

having the pseudonymization node receive from said data source node a user pseudonym and then retrieve the equivalent pseudonyms of the user, either directly by using a stored table of pseudonyms or indirectly by using an invertible keyed function to recover the user identity, then send this user identity to the equivalent user identities managing node to provide the equivalent identities of the user, then generate the candidate equivalent pseudonyms of the user from the received equivalent identities of the user, and then send them to the data source nodes connected thereto;

the said forward flooding process comprises:

having the data source nodes connected to the pseudonymization node send forwards to all the data nodes connected thereto the requests that contain the received equivalent pseudonyms of the user;

when a data node in said data profiling network receives at its inputs one or more requests that contain equivalent pseudonyms from at least one other data node connected thereto, having the data node search for the user data record storing one of the received equivalent pseudonyms as input user pseudonyms;

if such user data record is found and the data node is the said data node receiving the new input data, having the data node use the found user data record for storing the received new input data;

if such user data record is found and the data node is different from the said data node receiving the new input data, having the data node continue the forward flooding process by sending forwards the output user pseudonyms stored in the user data record to all the other data nodes connected to its outputs.

In an embodiment of the invention the method may comprise:

in case, in said data node, the user data record corresponding to the received new input data is not found even after receiving the equivalent user pseudonyms, having the data node creating a new user data record in respect of said user, and store the received new input data therein together with the received new user pseudonym received along with the received new input data.

Said user pseudonyms may be dynamically changed after a predetermined time depending on a validity time period of the user data profile.

The at least data node and the at least one data source node are preferably prevented from assigning, using or storing, in association with data related to a user, static user pseudonyms that do not change in time or old values of dynamic user pseudonyms generated and used in the past for the user.

In an embodiment of the invention the method may comprise:

when a user data profile requesting entity wants to retrieve user data profile stored in the at least one data node:

having the user data profile requesting entity send a user data profile request to a selected one among the at least one data node of the data profiling network, wherein said user data profile data request contains an identifier of the data node that stores the requested user data profile to be retrieved, and the currently valid input or output user pseudonym respectively stored in the user data record of said selected one among the at least one data node to which the user data profile data request is sent;

in case said selected one among the at least one data node receiving the user data profile request is the data node storing the requested user data profile, having the data node retrieve the requested user data profile stored in the user data record in association with the specified currently valid input or output user pseudonym, and provide to the user data profile requesting entity the retrieved user data profile;

in case said selected one among the at least one data node receiving the user data profile request is not the data node storing the requested user data profile:

a) having said selected one among the at least one data node identify, in the user data records stored therein, the output user pseudonym corresponding to the received currently valid output user pseudonym contained in the received user data profile request or the output user pseudonym corresponding to the received currently valid input user pseudonym contained in the received user data profile request, and forward the retrieved output user pseudonym to all further data nodes connected thereto; and b) repeating step a) by using the received retrieved output user pseudonym instead of said currently valid output user pseudonym or said currently valid input user pseudonym, until the data node storing the requested user data profile is reached and, then, having the data node retrieve the requested user data profile stored in the corresponding user data record.

The method may further comprise, before performing the above steps, having the user data profile requesting entity request to the pseudonymization node a currently valid input pseudonym of the user corresponding to a given temporary or permanent user identifier contained in said user data profile request.

The data profiling network may comprise at least a first and a second disjoint data profiling networks, each one comprising respective data nodes, respective data sources providing input data on the basis of which user data profiles are calculated by the data nodes, respective pseudonymization nodes for generating user pseudonyms from user identities, and wherein a combined equivalent user identities managing node is provided, operable to manage as equivalents different identities of a same user corresponding to different data sources in the first and second data profiling networks, the combined equivalent user identities managing node being exploited for retrieving user data profiles of a user in the second data profiling network when data profiles of said user are requested through the first data profiling network.

Another aspect of the present invention relates to a data profiling network configured to perform the above method.

BRIEF DESCRIPTION OF THE DRAWINGS

These and other features and advantages of the present invention will be made apparent by the following detailed description of exemplifying and non-limiting embodiments thereof, with reference to the enclosed drawings, wherein.

DETAILED DESCRIPTION OF EMBODIMENTS OF THE INVENTION

Data Profiling Network

According to an embodiment of the present invention, a Data Profiling Network (hereinafter, shortly, DPN) is a computer network comprising three types of logical nodes: (1) identity nodes (hereinafter, also referred to as ID-nodes), (2) pseudonym nodes (hereinafter, also referred to as PID-nodes), and (3) data profiling nodes or, simply, data nodes (hereinafter, also referred to as D-nodes). The logical nodes of the DPN can be physically implemented in a centralized or distributed way by using the computer technology.

Input data to the DPN (hereinafter, also referred to as raw input data) is supplied by a number of data sources (DSs or DS-nodes). In addition, associated components of the DPN are users, intended as real-world entities that provide raw input data through various data sources and utilize the output data profile produced by the DPN. For example, users may be individuals (persons) or groups of persons, companies, organizations, Internet websites, or devices such as personal computers and mobile phones.

Figure 1:
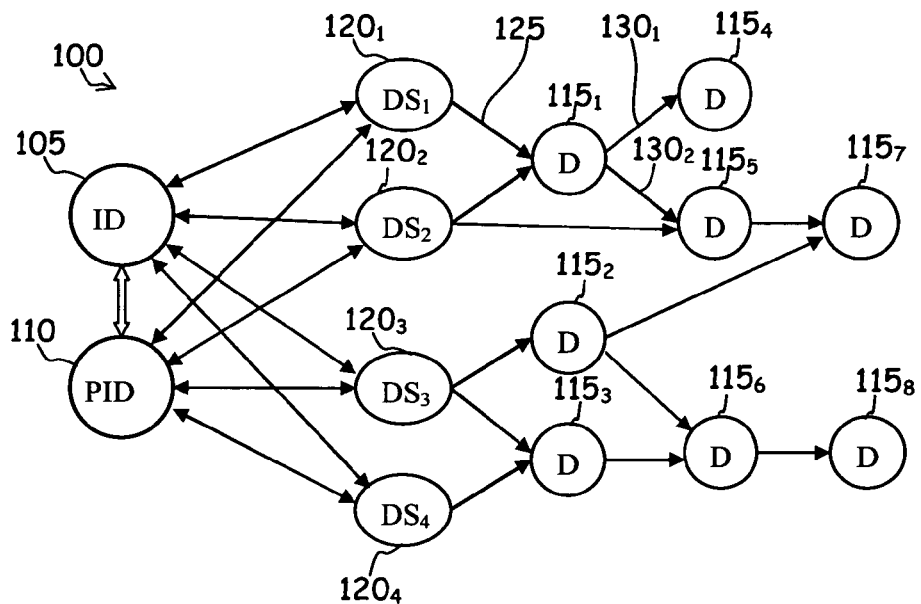
FIG. 1 shows the general structure of an exemplary data profiling network wherein the method according to the present invention can be implemented, the data profiling network comprising D-nodes, an ID-node, a trusted PID-node as well as data sources (DSs or DS-nodes) providing raw data input to the network (in the considered example, 4 data sources and 8 D-nodes)

Referring to the example depicted in FIG. 1, the DPN, globally denoted as 100, comprises one ID-node 105, one PID-node 110, eight D-nodes $115_1$-$115_8$, and four data sources (DS-nodes) $120_1$-$120_4$. The four DS-nodes $120_1$-$120_4$ may for example correspond to four different Internet websites collecting raw input data about the website usage by the users, whereas the eight D-nodes $115_1$-$115_8$ aggregate and process the received input data related to a same user into the corresponding output data (data profiles) to be used for different applications (e.g., for targeted marketing by authorized entities via customized banner advertisements). Alternatively, the four DS-nodes $120_1$-$120_4$ may correspond to different networks (e.g., fixed or mobile) of the same or different ISPs, in which case the raw input data is extracted from the corresponding traffic data (e.g., by network probes).

ID-nodes (like ID-node 105 in the considered example) manage equivalent identities (hereinafter also referred to as IDs) of the DPN users, wherein each of the equivalent identities of a certain user corresponds to a different data source. The underlying assumption is that, in the DPN, all the users being represented by a same identity with respect to any data source are effectively regarded as one single user. An ID-node thus implements an identity equivalency table storing equivalent identities corresponding to the same user, where each identity corresponds to a different data source and is itself composed of an ordered set of user's identifiers. In the identity equivalency table held by the ID-node, the identities ID are indexed by the respective data sources i (i being an index that identifies a single data source: for example, $120_i$, with i=1, 2, 3, 4), and the identity equivalency table thus consists of equivalent identity sets $\{(i, ID)\}$, one set for each single user.

ID-nodes have an update operation mode: in the update operation mode, an ID-node updates the respective identity equivalency table based on the equivalent identities received at its input. In addition, an ID-node can also generate and store a new, unique identity for a user that can be exploited as a unique (possibly static) representation of the set of equivalent identities of that user.

ID-nodes have a generation operating mode: in the generation operating mode, an ID-node receives at its input, from a data source i, an identity ID, i.e., (i, ID), of a user, and provides the corresponding set of equivalent identities {(i, ID)} for that user at its output. Formally, in the generation operating mode, an ID-node realizes a mapping (i, ID)→{(i, ID)}.

For a given DPN, there may exist a single ID-node managing the identities of all the users and in respect of all the data sources, or, alternatively multiple, mutually connected ID-nodes may be provided, each one managing the identities for respective subsets of users and data sources. Each ID-node can be implemented as a computer server in a computer network. However, without loss of generality, the plurality of ID-nodes serving a single DPN can be regarded as a single logical ID-node; hereinafter, it will therefore be assumed that the DPN comprises a single ID-node.

User identifiers and identities in the DPN are managed by data sources and by ID-nodes. Each user identifier can be classified as temporary (i.e., short-term) or permanent (i.e., long-term) according to the user identifier validity period being relatively short or relatively long, respectively. An example of permanent identifier is a person's name (which is not expected to change during the person's life) or home address (which may change sporadically), whereas an example of temporary identifier is a location identifier describing a temporary location of a data source, such as an IP address over the Internet. ID-nodes may manage only permanent user identifiers and the corresponding equivalent identities, but in some cases temporary user identifiers can also be managed by the ID-nodes jointly with the permanent identifiers.

A user identity may be composed of one or more permanent identifiers and one or more temporary identifiers; then, pseudonymization may relate either to the identity as a whole or to particular (permanent and/or temporary) identifiers or to subsets of identifiers selected among the identifiers composing the identity. In particular, it may be desirable to pseudonymize individual temporary identifiers separately from the permanent identifiers of an identity.

A PID-node (like PID node 110 in the considered example) transforms (i.e., pseudonymizes) a given user identifier or a user identity as a whole, defined as an ordered set of (permanent and temporary) user identifiers, into a corresponding pseudonym. According to the present invention, while the acronym ID is equivalently used as a generic notation for an identity as a whole or for an identifier belonging to the set of identifiers constituting an identity, the acronym PID is used as a generic notation for the corresponding pseudonym. A PID-node receives an ID at its input and generates the corresponding pseudonym PID at its output. Formally, a PID-node realizes an injective mapping ID→PID, where the mapping can depend on a particular data source and, possibly, on individual identifiers or subsets of identifiers for a given data source. At any time, each data source uses the same ID for the same user, i.e., a DS cannot use two different IDs for the same user at the same time; but, in time, the ID of a user used by a DS can change (e.g., if the ID is temporary). It should be noted that if the mapping ID→PID realized by the PID-node is not injective, then subsets of IDs resulting in a same PID are effectively treated as a single user. As explained above, it is implicitly assumed that the equivalent IDs (identities or individual or subsets of identifiers making up the identities) originating from different data sources and the corresponding pseudonyms are indexed by the respective data sources. Accordingly, an identity with respect to a certain data source is transformed into a single PID if all the identifiers comprised in the identity are transformed jointly. Alternatively, if the identifiers comprised in the identity are transformed individually, then the identity is transformed into an ordered set PID of individual pseudonyms, each one corresponding to the individual identifiers or their subsets. Even more generally, if a PID-node receives a set {ID} of equivalent IDs corresponding to one or more indexed data sources at its input, then it generates a corresponding set {PID} of equivalent pseudonyms at its output. For privacy protection, it is assumed that the PID-nodes are trusted, not to reveal the ID→PID associations to unauthorized entities. Each PID-node can be implemented as a secure computer server in a computer network or as a tamper-resistant hardware security module (HSM).

D-nodes (like D-nodes $115_1$-$115_8$ in the considered example) deal with the user data to be profiled within the DPN, i.e., D-nodes generate data profiles of the users.

The D-nodes of the DPN may be input D-nodes, intermediate D-nodes, and output D-nodes.

An input D-node (like D-nodes $115_1$-$115_3$ and $115_5$ in the considered example) receives raw input data directly from at least one data source (in the considered example, input D-node $115_1$ receives raw input data directly from data sources $DS_1$ ($120_1$) and $DS_2$ ($120_2$); input D-node $115_2$ receives raw input data directly from data source $DS_3$; input D-node $115_3$ receives raw input data directly from data sources $DS_3$ ($120_3$) and $DS_4$ ($120_4$); and input D-node $115_5$ receives raw input data directly from data source $DS_2$) and, possibly, it receives input data from other D-nodes as well (like for example input D-node $115_5$, that receives raw input data also from D-node $115_1$). First-level input D-nodes receive raw input data only directly from at least one data source, and not from other D-nodes (this is, for example, the case of D-nodes $115_1$, $115_2$, $115_3$).

An intermediate D-node receives input data only from other D-nodes (and not from any data source) and, upon processing, provides output data to other D-nodes, but not directly to the users. Accordingly, it suffices that the intermediate D-nodes implement only temporary storage of output data. In the considered example, D-node $115_6$ is an intermediate node if it does not make available output data directly to the users.

An output D-node receives input data from data sources or other D-nodes and, upon processing, provides output data directly to the users and, possibly, to other D-nodes as well. Accordingly, output D-nodes implement permanent storage of output data, e.g., in the form of database or any other nonvolatile memory. In the considered example, D-nodes $115_4$, $115_7$, $115_8$ are output D-nodes, since they do not make available output data to other D-nodes. A special type of output D-nodes are user D-nodes, storing user data profiles in the user equipment (e.g., personal computers of mobile phones).

The oriented connection between a generic DS and a generic D-node (like the oriented connection 125 between the DS $120_1$ and the D-node $115_1$ in the considered example) and between two generic D-nodes in the DPN (like the oriented connection $130_1$ between D-node $115_1$ and D-node $115_4$, and the oriented connection $130_2$ between D-node $115_1$ and D-node $115_5$ in the considered example) is called a "data channel" or simply a "channel". All data transmitted among DSs and D-nodes and among D-nodes over data channels is pseudonymized, i.e., labeled by dynamic pseudonyms, which, according to the present invention, can be used to link together the data corresponding to the same user at different times, by applying the dynamic pseudonymization method described in the sequel.

Functionality of D-Nodes

A D-node in the DPN can have a number of inputs and a number of outputs connected to other D-nodes by output channels (referring to the considered example, D-node $115_1$ has two outputs, respectively connected to D-node $115_4$ and D-node $115_5$ by a respective output channel $130_1$ and $130_2$). A generic output of a D-node may be connected to one or more inputs of other D-nodes by individual output channels. As explained above, if a D-node is an output D-node, then there can exist outputs of the D-node without any output channels: in this case, the corresponding output data is not sent out to other D-nodes, but should be accessible by authorized users. Each input to a D-node is connected to a data source (DS) or to another D-node by an input channel, which supplies the input data corresponding to different users and labeled by pseudonyms.

Figure 2:
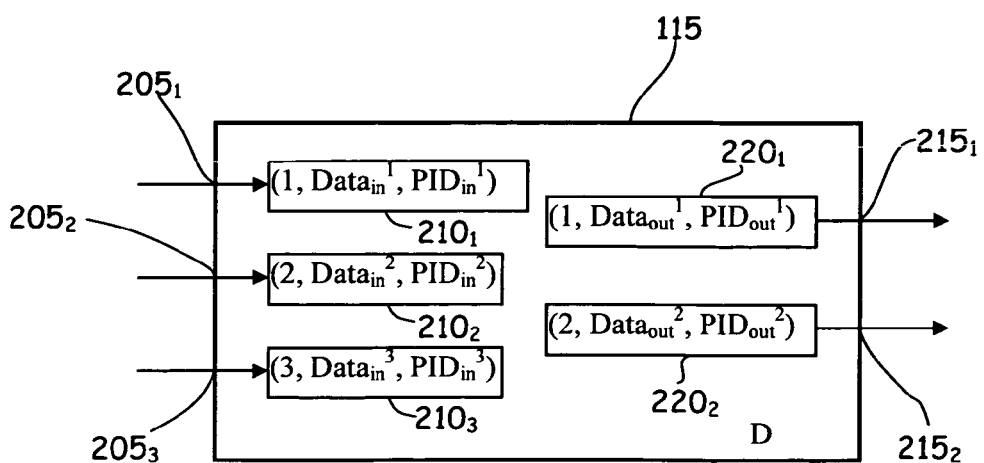
FIG. 2 shows the general structure of a D-node of the data profiling network (in the herein considered example, a D-node with 3 input channels and 2 output channels)

Let the individual inputs and outputs for a generic D-node be indexed by j and k, respectively. Then the pseudonymized input data received by a D-node can be temporarily stored in an input data record $\{(j, Data_{in}, PID_{in})\}$, where j is the index identifying the j-th input of the D-node, $Data_{in}$ is the input data received by the D-node at the j-th input, and the input pseudonym $PID_{in}$ is a single-valued pseudonym or a multi-valued pseudonym, i.e., an ordered set of pseudonym values representing the input data $Data_{in}$ for the j-th input. Similarly, the pseudonymized output data of a D-node can be stored in an output data record $\{(k, Data_{out}, PID_{out})\}$, where k is the index identifying the k-th output of the D-node, $Data_{out}$ is the output data, and the output pseudonym $PID_{out}$ is a single-valued pseudonym representing the output data $Data_{out}$ for the k-th output. The output pseudonym is assumed to take a single value for simplicity, whereas the input pseudonym can take multiple values if the input data is received directly from a DS. For distinction, multi-valued input pseudonyms are hereinafter also denoted as $(PID_{in})$. It should be noted that the output pseudonym $PID_{out}$ of the k-th output is not needed if this output has no associated output channels. The input and output data records may be stored together in a joint data record ($\{(j, Data_{in}, PIN_{in})\}; \{(k, Data_{out}, PID_{out})\}$) corresponding to an anonymous user. If the input and output data records are stored separately, then they should share in common input and output pseudonyms, which point to the same anonymous user. FIG. 2 schematically shows a D-node 115 with three inputs $205_1$, $205_2$, $205_3$, with associated input data records $210_1$, $210_2$, $210_3$, and two outputs $215_1$, $215_2$, with associated output data records $220_1$, $220_2$.

A DPN can be represented by a directed graph consisting of D-nodes and DSs acting as external input nodes. The underlying assumption is that the corresponding undirected graph is connected. Otherwise, the DPN could be divided into a number of disjoint components functioning separately from each other.

According to the here described exemplary embodiment of the dynamic pseudonymization method of the present invention, the input and output pseudonyms stored in the data records ($\{(j, Data_{in}, PID_{in})\}; \{(k, Data_{out}, PID_{out})\}$) of the D-nodes in the DPN change in time in a way that enables each D-node to find at each time the right data record corresponding to the received pseudonymized input data. The main paradigm enabling this functionality is that at each time, the new input pseudonym of a D-node (receiving D-node) is defined as the last received new output pseudonym from the corresponding previous D-node (sending D-node) in the DPN. Consequently, the old input pseudonym of the receiving D-node stored in its input data record $\{(j, Data_{in}, PID_{in})\}$ is thus equal to the old output pseudonym of the sending D-node, stored in the output data record $\{(k, Data_{out}, PID_{out})\}$ of the sending D-node, received by the receiving D-node in the past. This enables the receiving D-node to find the right user data record by using the old output pseudonym, which needs to be sent by the sending D-node together with the new output pseudonym. The received old output pseudonym will then match the stored value of the old input pseudonym in the respective input data record of the receiving D-node, corresponding to the right, yet anonymous user, provided that this value already exists in the table of stored data records of the receiving D-node. Upon finding the right data record, the received new output pseudonym is then substituted for the stored old input pseudonym (i.e., the received new output pseudonym becomes the new input pseudonym).

A D-node accumulates input data and updates output data (i.e., user profiles) by processing the accumulated input data at given times (e.g., periodically). Between two successive updates, the input data is only accumulated and, hence, $Data_{in}$ denotes all the input data accumulated for a certain user since the last update, for any given D-node input. On the other hand, as described above, for any given input, the input pseudonyms are not accumulated, but are only refreshed to the received new values and, hence, at each time, $PID_{in}$ denotes the latest input pseudonym (since the last update) of the receiving D-node, which is equal to the last received output pseudonym value of the respective sending D-node.

The output data of a D-node is updated (i.e., replaced by a new computed value) by processing the accumulated input data in a stateless or stateful way; a D-node updating the output data in a stateless way is referred to as a "stateless D-node", whereas a D-node updating the output data in a stateful way is referred to as a "stateful D-node". By stateless update it is meant that for each D-node output, the output data $Data_{out}$ is computed as a function of $\{(j, Data_{in})\}$, whereas by stateful update it is meant that for each D-node output, the output data $Data_{out}$ is computed as a function of $\{(j, Data_{in})\}$ and the additional variable S called the state corresponding to that D-node output. In addition, for each D-node output, the state S is updated as a function of the previous state and $\{(j, Data_{in})\}$. This implies that the output data record of a stateful D-node contains $\{(k, S, Data_{out}, PID_{out})\}$, where S is the state for the k-th D-node output. For example, if the output data is defined as the average value of the current input data and previous input data over a past period of time, then the state comprises all the previous input data that is needed for the computation of the average value. It is assumed that the update occurs at the same time for all the D-node outputs (if not, then a D-node can be logically divided into a number of D-nodes). After each update, the (temporary) input data $Data_{in}$ is erased from the input data record, which then becomes simply $\{(j, PID_{in})\}$, i.e., only the input pseudonyms remain to be stored.

If a D-node has at least one output channel connected to its outputs, then, at given times, the output data $Data_{out}$ is sent out over the respective output channel(s) to the corresponding D-node(s) in the DPN (for example, D-node $115_1$ sends out the output data $Data_{out}$ to D-node $115_4$ over the output channel $130_1$). In particular, this can occur after each update of the output data. Sending the output data need not occur at the same time for all the D-node outputs. For the output data $Data_{out}$ to be sent out, the old output pseudonym $PID_{out}^{old}$ is defined as the previous (stored) value of $PID_{out}$ and the output pseudonym $PID_{out}$ is updated by computing the new output pseudonym value as a function of the current input pseudonyms $\{(PID_{in})\}$ of all the inputs (at the time of sending). Preferably, this function should be sensitive to changes of one or more individual inputs. In particular, if the current input pseudonyms $\{(PID_{in})\}$ contain only one pseudonym value $PID_{in}$, then the new output pseudonym $PID_{out}$ can be defined as $PID_{out}=PID_{in}$. More generally, the output pseudonym $PID_{out}$ can be defined as the bitwise XOR of individual input pseudonyms represented as binary strings. The output data $Data_{out}$ is then sent out together with the old and new values of the corresponding output pseudonym $PID_{out}^{old}$, $PID_{out}$, i.e., as the triple $(Data_{out}, PID_{out}^{old}, PID_{out})$. As explained above, the right user data record in the receiving D-node can then be found by using the transmitted old output pseudonym $PID_{out}^{old}$, since in the receiving D-node this value coincides with the stored value of the input pseudonym in the respective data record. Upon finding the right user data record, the input pseudonym value in the input data record of the receiving D-node is then refreshed to the new value $PID_{out}$.

Figure 4:
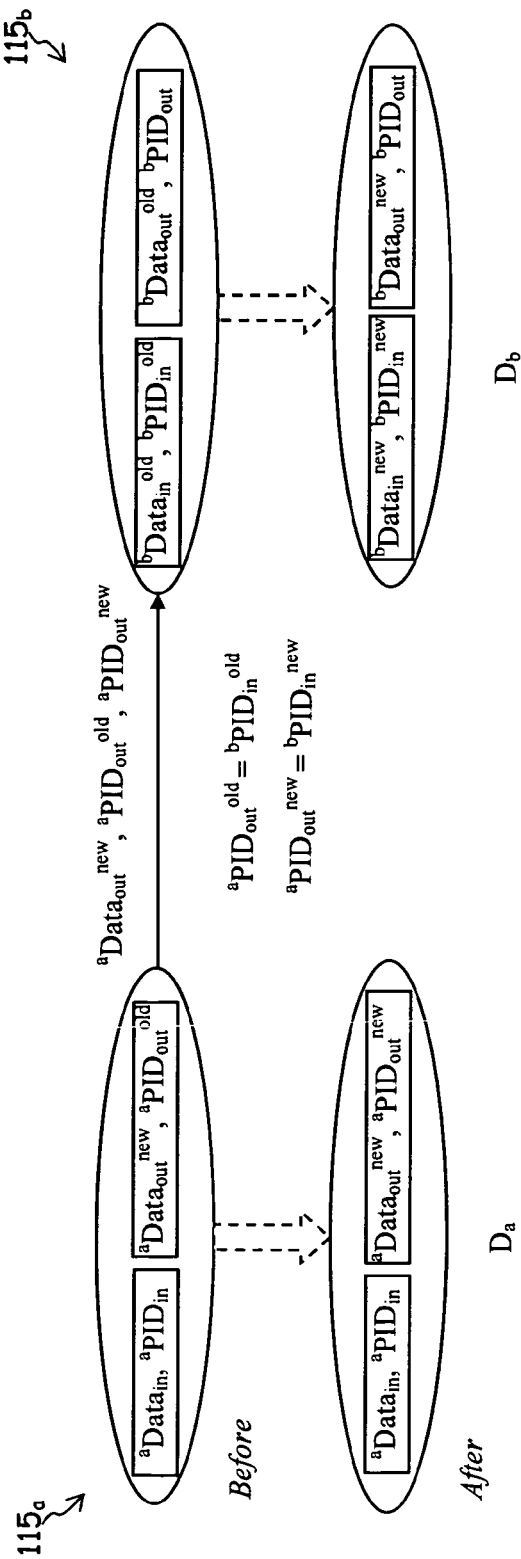
FIG. 4 shows change of pseudonyms and data in a D-node receiving input from another D-node.

The process described above is schematized in FIG. 4, wherein two generic interconnected D-nodes $115_a$ and $115_b$ are shown, D-node $115_a$ being the sending D-node and D-node $115_b$ being the receiving D-node. The drawing shows the evolution of the two D-nodes $115_a$ and $115_b$, in terms of the data and PID values stored in the output and input records thereof, before and after the output data is sent out by the sending D-node $115_a$ and before and after an update in the receiving D-node $115_b$.

If a D-node is an intermediate D-node, then the (temporary) output data $Data_{out}$ is erased from the output data record after it is sent out over the respective output channel(s), whereas the output pseudonym remains stored (in order to be sent out together with the future new output pseudonym at the next sent-out of the updated output data $Data_{out}$). The corresponding part of the output data record for the k-th output of an intermediate D-node then becomes (k, S, $PID_{out}$). For the erasure to be possible, it is assumed that, if a D-node is intermediate and there are multiple output channels connected to the same D-node output, then sending the output data occurs at the same time over all these output channels.

If a D-node is an output D-node, then the output data $Data_{out}$ is stored in order to be accessible by authorized users. In this case, there may or may not exist output channels and, if output channels exist, then the output data is not erased after it is sent out over the respective output channel(s). In particular, the output channels may lead to user D-nodes. If output channels do not exist for a given output, then the output pseudonym $PID_{out}$ is in fact not needed for that output, because the output data $Data_{out}$ can be found and accessed by using any of the corresponding current input pseudonyms from $\{(PID_{in})\}$, as described later on.

The functionality of an input D-node with respect to the pseudonymized input data received directly from a DS instead of from another D-node is analogous, with the only difference being that the new output pseudonym received from a DS may be a single-valued pseudonym (as is the case for any D-node that is not an input node) or a multi-valued pseudonym, i.e., an ordered set of pseudonyms corresponding to different identifiers or subsets of identifiers of the same user with respect to the given DS. This single-valued or multi-valued new output pseudonym $PID_{out}$ is generated, upon request from the DS, by a PID-node (like the PID-node 110 in the considered example) and sent to the DS together with the single-valued or multi-valued old output pseudonym or a set of candidate old output pseudonyms. Accordingly, when the receiving input D-node finds the right data record, then the input pseudonym $PID_{in}$ of the receiving input D-node is set equal to the new single-valued or multi-valued new output pseudonym $PID_{out}$ received from the sending DS, respectively. On the other hand, as described previously, when the pseudonymized input data is received from another D-node then the received output pseudonym is always a single-valued pseudonym $PID_{out}$ generated by the sending D-node and hence the corresponding input pseudonym $PID_{in}$ of the receiving D-node is then a single pseudonym.

Functionality of PID-Nodes

A PID-node (like the PID-node 110 in the exemplary DPN here considered) operates in the DPN as a serving entity in respect of data sources and ID-nodes. The PID-node may receive an ID as a single identifier or an identity (set of identifiers) from a requesting DS (like one of the four DSs $120_1$-$120_4$, in the considered example) at its input, in which case the PID-node generates the corresponding new single-valued PID at its output and then sends back this newly generated PID to the requesting DS, together with the set of possible old values of the PID. If a PID-node receives at its input from a DS an ID as an ordered set of identifiers or subsets thereof to be transformed individually, then the PID-node generates the corresponding new multi-valued PID as an ordered set of PID values at its output, and sends back this new multi-valued PID to the DS, together with the set of possible old values of the PID. In a special case, if the new pseudonym values coincide with the old pseudonym values, then the pseudonym is not effectively changed. Alternatively, if a PID-node receives a set $\{ID\}$ of equivalent IDs from the ID-node (like the ID-node 105 in FIG. 1), where the equivalent IDs are indexed by the respective DSs, then the PID-node reproduces the corresponding current indexed set $\{PID\}$ at its output, and sends this set $\{PID\}$ to the ID-node.

The underlying assumption is that each pseudonymized identifier or identity is a unique representation of a user in the given environment (global or local), with probability 1 or with a very high probability. In an embodiment of the present invention, the old and new PIDs generated by the PID-node are jointly transmitted to a requesting DS, preferably in an encrypted and authenticated form, to be then forwarded by the DS to the corresponding input D-nodes together with the raw input data related to an anonymous user. For privacy, the DS does not store any data, identities, identifiers, or the corresponding pseudonyms. It is assumed that the input D-nodes share with the PID-node the corresponding keys needed for the decryption and authentication.

A PID-node can generate a dynamic PID randomly, pseudorandomly, or as a keyed function of the input ID, where the used secret key is dynamic, i.e., changes in time. The keyed function can be defined in terms of encryption and cryptographic hash functions. Dynamic pseudonyms vary in time, possibly, in a way depending on a particular DS. Pseudonyms can be changed periodically, at pre-defined times, or in an event-based manner, upon occurrence of certain events. In particular, events triggering the pseydonym change can be defined by the DSs (e.g., initiation of the data acquisition process such as an IP-session on the Internet or an access to a given website) or by the PID-node itself (e.g., in terms of the validity periods and expiration times associated with the generated pseudonyms). Random and pseudorandom PIDs need to be securely stored in the (ID, PID) table of the PID-node, whereas keyed PIDs need not be stored since a new PID can be generated at any time by using the current secret key, whereas a set of possible old PIDs can be reproduced by using a set of possible old secret keys that may have been used in the past, with respect to a given validity period. Accordingly, at any time, the (ID, PID) table of the PID-node stores the latest generated PIDs. It should be noted that since in practice the space of all possible IDs is usually not very large, storing the (ID, PID) table in a storage medium is feasible by using current technologies. By secure storage it is meant that the PID entries should be stored encrypted and that the memory encryption key should be securely stored in hardware or software.

At any time, the mapping (ID, PID) should be injective on a set of possible IDs, i.e., different IDs should be mapped into different PIDs. Both the keyed function and its inverse should be difficult to compute with the current technologies if the key is unknown. In particular, this implies that the key should be practically unpredictable (e.g., a 128-bit key). The injectiveness can be guaranteed either theoretically, with probability 1, or practically, with a very high probability. For example, the injectiveness is guaranteed theoretically if an encryption function is chosen for the keyed function and it is guaranteed with a very high probability if the keyed function is defined as a cryptographic hash of the output of an encryption function or a cryptographic hash of a concatenation of the input ID and the secret key. Since, in practice, the space of all possible IDs is usually not very large, the injectiveness can at any time be checked by sorting out the generated PIDs for all possible IDs. Each new random or pseudorandom PID can then repeatedly be generated until the injectiveness is obtained. Alternatively, if the PIDs are randomly chosen from a sufficiently large space, then the injectiveness can be satisfied with a very high probability and need not be checked.

One PID-node can implement the dynamic pseudonymization functionality for an individual DS or for a set of DSs (possibly all of them, like the PID-node 110 in the exemplary DPN of FIG. 1). In the case of keyed pseudonyms, the key can depend on a particular DS. With respect to a given DS, a PID-node can implement the dynamic pseudonymization functionality for an individual identifier or for a set of identifiers (possibly all of them). The pseudonym values, together with the respective IDs, corresponding to a single user (for multiple DSs and multiple identifiers for a single DS) are jointly stored in the same data record of the (ID, PID) table of a given PID-node. It is assumed that a DS-node is connected to all the PID-nodes generating the needed pseudonyms. As mentioned in the foregoing, without loss of generality, the multitude of PID-nodes serving a single DPN can be regarded as a single logical PID-node, referred to as the PID-node in the present invention.

If the PID-node stores an (ID, PID) table, then the old value of a PID is directly recovered from the table, before the generated new PID is substituted for this old PID value. For a keyed PID, which is not stored in a table, the old value, which has been generated by using an old key, cannot be reproduced if the used value of the old key is unknown. In this case, the PID-node generates a set of candidate old PIDs, from the same ID, by using a set of old keys that may have been used in an adopted validity period for the corresponding data profile, and then sends this set of candidate old PIDs to the requesting DS. For example, if T denotes the validity period and $T_K$ the period of changing the key, then there are $\lceil T/T_K \rceil$ old key values that may have been used in the last validity period. Alternatively, in a solution with storage, the PID-node stores a table (ID, $I_K$), where $I_K$ denotes the index of the key used to generate the latest PID, together with a secure (much smaller) table ($I_K$, K) mapping the key indexes into the key values. The advantage is that the relatively big table (ID, $I_K$) does not have to be securely stored. In this case, the old PID can be reproduced at any time by recovering $I_K$ from the first table and the corresponding K from the second, securely stored table.

Operation of the DPN

As mentioned above, a DPN, like the exemplary DPN 100 in FIG. 1, consists of D-nodes (like D-nodes $115_1$-$115_8$), PID-nodes (like PID-node 110), and ID-nodes (like ID-node 105), as well as of DSs (like DSs $120_1$-$120_4$) supplying raw data input to the DPN, where the pluralities of ID-nodes and PID-nodes may be respectively regarded as a single logical ID-node and a single logical PID-node, herein referred to as the ID-node and the PID-node, respectively. As described in the foregoing, the first-level input D-nodes (like D-nodes $115_1$, $115_2$, $115_3$ in FIG. 1) have inputs connected to input channels coming only from DSs, whereas other input D-nodes can receive input channels both from DSs and other D-nodes. The D-nodes are connected together by data channels into a network, which can be represented by an acyclic or cyclic graph. The output D-nodes store and provide output data to authorized users, whereas the intermediate D-nodes temporarily store and provide output data to other D-nodes only.

Figure 3:
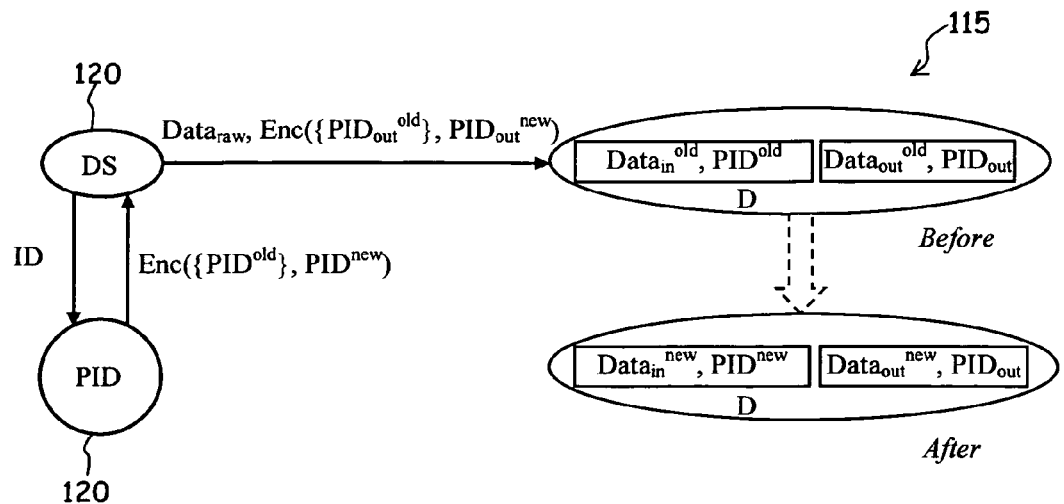
FIG. 3 shows the interaction between a DS, the PID-node and a D-node, receiving input from a DS-node, and a change of pseudonyms and data in the D-node receiving input from the DS-node.

As schematized in FIG. 3, each DS (a generic DS 120 is shown in FIG. 3) occasionally sends the pseudonymized raw input data related to an anonymous user to the input D-nodes connected thereto, for example, simultaneously (in FIG. 3, a generic D-node 115 is shown). More precisely, raw input data $Data_{raw}$ is sent out together with the old and new values of the corresponding output pseudonym, which the DS received from the PID-node, i.e., as the triple ($Data_{raw}$, $\{PID_{out}^{old}\}$, $PID_{out}^{new}$). All the pseudonyms are preferably jointly encrypted and authenticated, the encryption and verification keys being securely stored in the respective input D-nodes (thus, as depicted in FIG. 3, the triple sent out by the DS-node 120 is actually ($Data_{raw}$, $Enc(\{PID_{out}^{old}\}$, $PID_{out}^{new}$)). The DS-node temporarily stores the data sent out together with the ID, as the data record (ID, $Data_{raw}$, $\{PID_{out}^{old}\}$, $PID_{out}$), which is thereafter erased upon receiving an acknowledgment from the input D-node, acknowledging that the data was successfully received and stored.

If the pseudonyms or the indexes of the used keys are stored in the PID-node, then the set of possible old pseudonyms $\{PID_{out}^{old}\}$ reduces to a single old pseudonym $PID_{out}^{old}$, which itself can be single-valued or multi-valued, depending on whether the identifiers are pseudonymized separately or jointly, respectively. The $PID_{out}^{old}$ field is empty if the corresponding entry in the (ID, PID) table in the PID-node does not exist, i.e., if the new pseudonym $PID_{out}$ is generated by the PID-node for the first time (because it is the first time that, for that user, a DS requests to the PID-node the generation of a pseudonym). If the $PID_{out}^{old}$ field is not empty, then, due to a previous data submission, there exists a data record in each of the connected input D-nodes that contains $PID_{out}^{old}$ as the $PID_{in}$ entry for that DS. The right data record in each receiving D-node is then found as the (unique) record containing $PID_{out}^{old}$ ($PID^{old}$ in FIG. 3) as the respective $PID_{in}$ entry. Upon finding the data record, the found input pseudonym $PID_{in}$ is then refreshed to the received new value $PID_{out}$ ($PID^{new}$ in FIG. 3) and the raw data $Data_{raw}$ is accumulated into $Data_{in}$ (in FIG. 3, $Data_{in}^{new}$ is obtained by accumulating $Data_{in}^{old}$ and $Data_{raw}$).

If there is no stored (ID, PID) table in the PID-node, then the set of possible old pseudonyms $\{PID_{out}^{old}\}$ generally contains multiple candidate pseudonyms, obtained from the same ID by using different old keys, with respect to an adopted validity period. The right data record in each receiving D-node, if it exists, is then found as the (unique) record containing one of the candidate old pseudonyms from $\{PID_{out}^{old}\}$ as the $PID_{in}$ entry for that DS. Upon finding the right data record, if it exists, the found input pseudonym $PID_{in}$ is then refreshed to the received new value $PID_{out}$ and $Data_{raw}$ is accumulated into $Data_{in}$.

Each DS can be implemented as a family of constituent DSs, all connected to the PID-node, where each constituent DS sends out to D-nodes only a part of the raw data $Data_{raw}$ and, possibly, only a part of multi-valued $PID_{out}$, which uniquely determines an anonymous user, and may or may not be updated to a new value. The right data record is then found by using only the part of multi-valued $PID_{out}$ for the respective DS family. The constituent DSs can be logically or physically separated.

In one embodiment, a DS may send out to the D-nodes connected thereto only a new output pseudonym $PID_{out}$ updated to a new value, accompanied by no raw data $Data_{raw}$ (for a multi-valued pseudonym $PID_{out}$ only some of the constituent pseudonym values can be updated). The pseudonym is changed either because one of the temporary identifiers (e.g., a locator such as an IP address) has changed or the pseudonym corresponding to one of the permanent identifiers needs to be changed in order to avoid that the same pseudonym is being used over long periods (e.g., this may be the case when sending high-volume raw data $Data_{raw}$).

In another embodiment, raw data $Data_{raw}$ is sent out together with only a part of $PID_{out}$, which itself is not updated to a new value, but is sufficient for identifying a user. For example, a temporary identifier such as a locator (e.g., an IP address over the Internet) can be used for sending out the raw data, but the corresponding pseudonym is not required to be changed each time the raw data is sent out as long as the temporary identifier remains the same.

If, at a D-node, the sought data record with stored pseudonym $PID_{in}$ matching the received pseudonym $PID_{out}^{old}$ or $\{PID_{out}^{old}\}$ received from a sending DS is not found, then this means that such DS is sending the raw data regarding the respective user for the first time. However, it is possible that the record of that same user already exists, due to the fact that raw data relating to that user has been sent to the considered D-node in the past from other DSs or output data relating to that user has been sent to the considered D-node in the past from other D-nodes (this latter case applies to an input D-node not being a first-level input D-node, i.e., an input D-node that can also receive input data from another D-node). This may occur either if the $PID_{out}^{old}$ field is empty (in the case of stored pseudonyms) or if it is not empty (in the case of keyed pseudonyms that are not stored). In either case, the sought data record is initially attempted to be found by using the candidate current pseudonyms corresponding to the temporary identifiers (e.g., a locator) that can be shared in common by several DSs or other D-nodes, under the assumption that the corresponding PIDs are also the same. Namely, if the same locator (e.g., an IP address) is simultaneously used for two different DSs (e.g., two websites on the internet), then the record may possibly be found by using the same corresponding pseudonym for either one of the two DSs.

If this initial check-up of common temporary identifiers does not yield a data record, then the sought data record is attempted to be found by invoking a procedure hereinafter referred to as the ID-correlation protocol, which involves the respective DS and the ID-node, by using the candidate current pseudonyms sent by other DSs or by other D-nodes in the past. Consequently, the ID-correlation protocol is run each time the sought data record is not found in the respective input D-node, upon receiving pseudonymized raw input data from a DS, by using the candidate old pseudonym(s) sent by the DS along with the raw input data, provided that there exist other inputs to the input D-node and that the above-mentioned initial check-up of common temporary identifiers failed to find a data record that corresponds to the considered user. In particular, neither the initial check-up nor the ID-correlation protocol are performed if there exists only one input to the input D-node, coming from the considered DS. Before performing the ID-correlation protocol, the input D-node stores the received triple ($Data_{raw}$, $\{PID_{out}^{old}\}$, $PID_{out}$). It is assumed that each input D-node in the DPN is assigned a unique static identifier (e.g., a D-node index).

The ID-correlation protocol is initiated by the receiving input D-node, which generates, stores, and sends back to the sending DS a message initiating the ID-correlation protocol. The initiating message contains a message identifier comprising a nonce (a "number used once") locally generated by the input D-node (e.g., a time stamp or a serial number) and the identifier (e.g., the D-node index) of the input D-node, which should be unique in the DPN. This initiating message also contains the received candidate old pseudonym(s) $PID_{out}^{old}$ or $\{PID_{out}^{old}\}$. Upon receiving this message from the input D-node, the DS finds the corresponding ID from the temporarily stored data record (by using the candidate old pseudonym(s)) and sends it to the ID-node asking for the candidate current PIDs corresponding to the user's equivalent IDs, with respect to all DSs in the DPN, to be reproduced. The ID-node then generates the corresponding set $\{(i, ID)\}$ of equivalent user's IDs, indexed by the respective DSs, and sends this set to the PID-node. It should be noted that if the ID-node stores only the permanent identifiers, then each generated ID, although consisting only of permanent identifiers, also uniquely determines the user. Based on the received set $\{(i, ID)\}$, the PID-node reproduces the corresponding set of candidate current pseudonyms $\{(i, \{PID_{out}^{old}\})\}$ at its output and sends them, preferably encrypted and authenticated, to the respective DSs along with the initiating message identifier. In the case of stored pseudonyms, this set of candidate current pseudonyms $\{(i, \{PID_{out}^{old}\})\}$ may also include the already stored pseudonyms for temporary identifiers, which have been received directly from the DSs in the past. In the case the PID-node does not store the pseudonyms, this set only contains the pseudonyms for permanent identifiers received from the ID-node. The ID-correlation protocol then continues by a forward flooding phase, described below.

Each DS, except the sending DS that sent the raw input data to the D-node initiating the ID-correlation protocol, forwards the received encrypted and authenticated set of candidate current pseudonyms to the neighboring input D-nodes in the DPN, to which it is connected, along with the received initiating message identifier, without any raw input data. Each neighboring input D-node then decrypts and authenticates the received candidate current pseudonyms. Now, if one of the input D-nodes is the D-node that initiated the ID-correlation protocol (i.e., the D-node with the same D-node identifier as the one contained in the initiating message identifier), then this input D-node stores the received message provided that the initiating message identifier in the received message matches one of the stored initiating message identifiers, otherwise it deletes the message if there is no match (due to faults). Otherwise, if the received initiating message identifier contains a different D-node identifier, then an input D-node proceeds by forwarding a modified message to all the subsequent neighboring D-nodes in the DPN, through each of its outputs, where the modification consists in replacing the received candidate current pseudonyms by the corresponding current output pseudonyms, provided that a data record is found. This is achieved by finding the data record, if it exists, by using each received candidate current pseudonym as an input pseudonym and by taking out the corresponding current output pseudonym from the respective output. Each D-node in the DPN (with a different D-node identifier) then proceeds in the same manner by forwarding the message containing the same message identifier and the substituted current pseudonym to the subsequent neighboring D-nodes in the DPN. In the case of cyclically connected D-nodes, a message with the same initiating message identifier is not forwarded by the same D-node more than once.

Consequently, the input D-node that initiated the ID-correlation protocol will receive and store, within an adopted time frame, a set of messages with the same initiation message identifier, matching one of the message identifiers stored, containing the candidate current pseudonyms for all the inputs connected to DSs or other D-nodes. The sought data record is then found, if it exists, by using this set of candidate current pseudonyms and looking for a match with an input pseudonym for the respective input. If the sought data record is not found, then the record does not exist at all and the input D-node then creates a new data record by using the stored new pseudonym $PID_{out}$ for the respective DS as the corresponding input pseudonym.

In a more general scenario, if a recipient D-node (in particular, an input D-node) is receiving pseudonymized input data from another D-node instead of from a DS, and if, at the recipient D-node, the sought data record is not found, then a procedure that is a modified version of the ID-correlation protocol, hereinafter referred to as the PID-correlation protocol, is used. Namely, in the ID-correlation protocol the DS node sending the data is able of sending the corresponding ID (i.e., the ID corresponding to the pseudonym that is sent to the D-node along with the data) to the ID-node, due to the fact that the DS temporarily stores a data record containing the ID. However, a D-node sending the data does not know the user ID for any of the DSs, but only the current input and output pseudonyms and a generated new value of the output pseudonym, where the old and new values of the output pseudonym are sent to the considered D-node, together with the output data.

The PID-correlation protocol is initiated if the sought data record in a recipient D-node receiving data (data profile related to a certain user) from another, sending D-node and having at least one other input is not found by using the old pseudonym sent by said sending D-node, provided that that the above-mentioned initial check-up of common temporary identifiers failed to find a data record. The objective of the PID-correlation protocol is to find the sought data record by using the current pseudonyms sent by other sending D-nodes or the candidate current pseudonyms sent by DSs to the recipient D-node under consideration. The PID-correlation protocol consists of the backward and forward phases described in connection with the ID-correlation protocol, where the forward phase consists of the forward flooding as in the ID-correlation protocol. However, the backward phase is more complex than in the ID-correlation protocol, because the message initiating the PID-correlation protocol is not sent directly to a DS which sent the raw input data and which temporarily stores the corresponding user ID. Instead, the PID-correlation protocol initiating message is sent to a D-node sending to the recipient D-node the output data, and the sending D-node does not have knowledge of the corresponding user ID.

Figure 5:
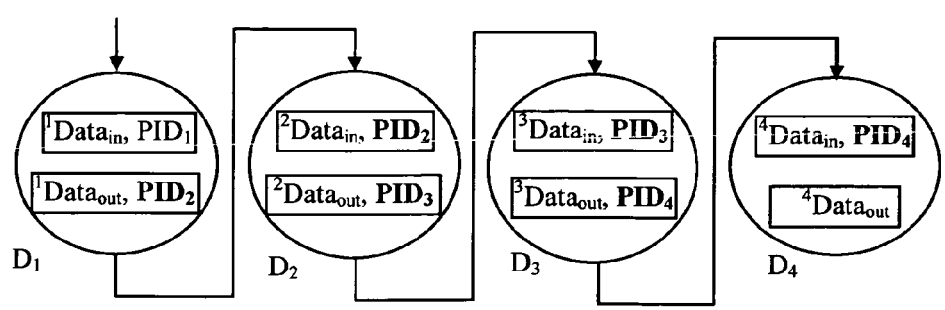
FIG. 5 illustrates a chain of dynamic pseudonyms formed at a given time by 4 consecutive D-nodes in the data profiling network.

The backward phase of the PID-correlation protocol consists of backtracking from the recipient D-node that received the output data along with the old and new values of the output pseudonym from another, sending D-node, in the form ($Data_{out}$, $PID_{out}^{old}$, $PID_{out}$). The backward phase starts by the recipient D-node sending the message initiating the PID-correlation protocol to this sending D-node, where the message contains $PID_{out}^{old}$. This sending D-node can then forward the message backwards through at least one of its input channels (e.g., all of them) supplying the input data contributing to its $Data_{out}$ associated with $PID_{out}^{old}$, where, for each of the involved inputs, the current input pseudonym $PID_{in}$ corresponding to that input is contained in the message sent back via that input to the corresponding previous sending D-node in the DPN. Since the sent $PID_{in}$ coincides with the output pseudonym $PID_{out}$ of the previous D-node, this D-node can find the respective data record corresponding to the $PID_{out}$ and recover the corresponding input pseudonyms $PID_{in}$ for the existing inputs. The backtracking process thus continues backwards, from any reached D-node to at least one previous D-node connected to that reached D-node, each time substituting the corresponding current input pseudonym of the current D-node for the received input pseudonym in the message, until, ultimately, the message reaches at least one DS (e.g., all of them) contributing to the output data $Data_{out}$ received by the D-node initiating the PID-correlation protocol. This message thus contains the corresponding input pseudonym $PID_{in}$ as the last output pseudonym $PID_{out}$ sent out by the DS and generated by the PID-node (for the respective user). This backtracking process is thus essentially enabled by the existing chains of stored pseudonyms (as schematized in FIG. 5), where, according to the method proposed in the present invention, at each time, the current input pseudonym of any D-node in the DPN is equal to the current output pseudonym of the previous D-node connected to this D-node.

The reached DS cannot reconstruct the ID from the received pseudonym $PID_{in}$, which is equal to the last pseudonym $PID_{out}$ sent out by that DS, due to the fact that any DS only temporarily stores the ID and erases it after receiving the acknowledgement from a recipient D-node connected thereto, but the reached DS can forward the message to the PID-node. Alternatively, the backtracking process can stop when the message reaches at least one input D-node, which receives at least one input from a DS. This input D-node then produces the same message and sends it directly to the PID-node, instead of forwarding it through the respective DS. Now, as in the ID-correlation protocol, the PID-node should reproduce the corresponding set of equivalent candidate current pseudonyms $\{(i, \{PID_{out}^{old}\})\}$ at its output and send them, encrypted and authenticated, to the respective DSs, along with the message identifier, in order to initiate the forward flooding phase of the PID-correlation protocol, which is the same as in the ID-correlation protocol. Since this cannot be done by using the set of equivalent IDs produced by the ID-node as in the ID-correlation protocol, the PID-node should directly reproduce the set of all PIDs equivalent to the received $PID_{in}$, which is valid for the DS from which $PID_{in}$ was received. In principle, there are two solutions to the problem depending on whether the PID-node stores the (ID, PID) table or not.

In the case the PID-node implements a storage of the PIDs, the PID-node searches through the stored table by using $PID_{in}$ as search key, and then recovers the set $\{(i, PID_{out}^{old})\}$ from the found record. This set may also contain the stored pseudonyms for temporary identifiers. In the case of keyed pseudonyms without storage, the keyed function used should satisfy an additional requirement that its inverse should be easy to compute when the key is known (e.g., it can be defined as an encryption function). The corresponding ID can thus be reconstructed by the PID-node from $PID_{in}$ and sent to the ID-node in the encrypted and authenticated form. As in the ID-correlation protocol, the ID-node then generates the corresponding set $\{(i, ID)\}$ of equivalent IDs indexed by the respective DSs and sends this generated set back to the PID-node in the encrypted and authenticated form. The PID-node then reproduces the corresponding set of candidate current pseudonyms $\{(i, \{PID_{out}^{old}\})\}$ at its output, by using the candidate old keys used in the past, as in the ID-correlation protocol. This set only contains the pseudonyms for the permanent identifiers received from the ID-node. In both cases, the PID-node then sends the recovered or reproduced set of pseudonyms, encrypted and authenticated, to the respective DSs along with the message identifier, to initiate the forward flooding phase as in the ID-correlation protocol.

In an embodiment of the present invention, in order to control the temporal linkability of data profiles, the privacy law, implemented by legal authorities, should specify the maximum linkability times for various user data profiles of interest. More precisely, the privacy law should specify the maximum allowed times for keeping the dynamic pseudonyms unchanged, for various data profiles, where these times may depend on the validity period of particular data profiles. Since these times can effectively be prolonged by memorizing the past values of the dynamic pseudonyms, it should be forbidden by the privacy law that any entity dealing with raw data or data profiles in a DPN (i.e., a DS or a D-node) may assign, store, and use any static pseudonyms associated with the data records of individual users or store the old values of dynamic pseudonyms generated and used in the past. In particular, to prevent the physical memory addresses from being effectively used as static pseudonyms, a data record in the D-nodes (especially, in the output D-nodes) should be updated by erasing the previous record and storing the updated content in a new record.

Accessing Data Profiles in DPN

Each output D-node in a DPN stores the data profiles of individual anonymous users as the output data, the stored data profiles being marked by the single-valued or multi-valued dynamic pseudonyms corresponding to individual inputs and outputs of the D-node. At any time, the current value of each input pseudonym is the last pseudonym received from a previous D-node or, directly, from a DS. Pseudonyms received from a DS can be single-valued PIDs, corresponding to the user identity ID as a whole, or multi-valued PIDs, corresponding to subsets of individual identifiers comprising the identity. At any time, the current value of each output pseudonym is the last pseudonym sent to subsequent D-nodes, which was generated as a single-valued pseudonym from the input pseudonyms at the time of last sending. The output pseudonyms are generated and used only for the output data being sent out to other D-nodes. The output data is updated by processing accumulated input data at given update times.

On the basis of data profiles of individual anonymous users, each output D-node can also store any statistical data computed from the individual data profiles (e.g., by averaging or counting techniques) and related to certain subsets of users, possibly all of them. In an embodiment of the present invention, at each output D-node, the data profiles and statistical data are stored in an encrypted form that can be decrypted only by authorized users.

At any time, authorized users can have access to the output data profiles and statistical data stored in output D-nodes, where the authorization can be defined by the access control rules and should be compliant with the privacy law. For both individual data profiles and statistical data, the output D-node and the specific output of that output D-node storing the desired data profiles should be specified. To access the statistical data, it is sufficient to have the necessary authorization accepted by the output D-node. To access individual data profiles of anonymous users, apart from the authorization, the requested data profiles should be specified by using the respective (dynamic) input and/or output pseudonyms in a practically meaningful way. The pseudonyms can be specified either directly or, alternatively, by the user identifiers in accordance with the privacy law, in which case the PID-node needs to be involved to reproduce the pseudonyms starting from the specified user identifiers. The pseudonyms themselves can relate to the specified output node or to any other D-node in the DPN such as, e.g., any input D-node. In the latter case, the specified output D-node can be reached by the forward flooding process described in the foregoing. Some exemplary cases of specifying the individual data profiles to be accessed are described in the sequel. It should be noted that the cases are not necessarily disjoint.

In a first exemplary case, any current input pseudonym of a chosen input D-node that has been received directly from a DS in the past is used for specifying the data profile to be accessed. Such an input pseudonym can be a single-valued pseudonym corresponding to an individual DS or any component or subset of components of a multi-valued pseudonym corresponding to a DS. More generally, the authorized user can also use any subset of such pseudonyms.

In order to access the requested data profile, the authorized user sends the chosen pseudonym to the chosen input D-node along with the identifier of an output D-node containing the desired data profile to be retrieved. The input D-node then initiates the forward flooding process with the message containing the output D-node identifier. The output D-node corresponding to such identifier then finds the requested data profile by using the corresponding last input pseudonym received from a previous D-node or directly from a DS, at the end of the underlying chain of dynamic pseudonyms (as schematized in FIG. 5).

In a second exemplary case, the input pseudonym used in the first exemplary case for accessing a desired data profile is obtained by the PID-node from a specified temporary user identifier, in accordance with the privacy law. In particular, the specified temporary user identifier can define the current location of a targeted anonymous user (e.g., the current IP address on the Internet). In this case, the recovered data profile of the user can be used for sending commercial information (e.g., personalized advertisement) to the user at a given location.

In a third exemplary case, the used input pseudonym from the first exemplary case is obtained by the PID-node from a specified permanent user identifier, in accordance with the privacy law. The privacy law should specify the identifiers, the data profiles, the authorized users, and the related conditions for accessing and using the user data profiles. In particular, if the specified permanent user identifier uniquely identifies the user (globally or locally), then the privacy law should specify the minimum data granularity as the minimum number of users per requested data profile for the access to be allowed.

In a fourth exemplary case, the data profile to be accessed is directly specified by an input pseudonym of the chosen output D-node storing the desired data profile. Such an input pseudonym can be received either from another D-node or from a DS, as in the first exemplary case. In particular, the chosen output D-node can be a user D-node storing a data profile of a particular user in the user equipment, where the data profile along with the corresponding input pseudonym has been received from an output database D-node, which stores the data profiles of all users, during the last (aperiodical or periodical) data profile update for that user. In this case, an authorized user can either recover directly the currently stored (old) data profile from the user equipment at a given location, in which case the input pseudonym is not used, or it can access the latest data profile of the user in the database D-node by using the input pseudonym from the user equipment as the output pseudonym in the database D-node. The recovered latest data profile of the user, together with the latest received input pseudonym, is then stored in the user equipment and can be used for sending commercial information (e.g., personalized advertisement) to the user at a given location.

Functionality of Combined DPN

A combined DPN is a system composed of a number (two or more) of disjoint DPNs. Each DPN functions separately, but the corresponding sets of users need not be disjoint. Individual DPNs can thus share common users. The main objective of a combined DPN according to the present invention is to enable joint access to data profiles of a same user stored in different DPNs, without changing the individual DPNs. It is assumed that the data profiles are stored in output D-nodes, which are specified by their identifiers, unique for the respective DPNs. The desired combination of DPNs can be achieved by introducing a combined ID-node formed by merging, i.e., aggregating the ID-nodes of the individual DPNs. Accordingly, the combined ID-node implements a combined table storing all the equivalent identities of the same user, for different DPNs and for different data sources of each DPN, where each DPN is assigned a different index for distinction.

In one embodiment, an authorized user accessing a data profile in a specified output (hereinafter denoted as $Out_1$) of a specified output D-node (hereinafter denoted as $D_1$) in a given DPN at a given time wishes to access the data profile of the same user, if it exists, in a specified output (hereinafter denoted as $Out_2$) of a specified output D-node (hereinafter denoted as $D_2$) of another DPN, which itself is specified by the corresponding index. The two DPNs are hereinafter denoted as $DPN_1$ and $DPN_2$, respectively. The authorized user specifies the requested data profile in $D_1/Out_1$ of $DPN_1$ by a pseudonym or by a user identifier, as explained above. In order to retrieve the requested data profile in $DPN_2$, it is necessary to recover the current input or output pseudonyms corresponding to the same user in $D_2$ of $DPN_2$.

If the requested data profile in $DPN_1$ is specified by a user identifier, then the corresponding pseudonyms in $DPN_2$ can be recovered by a variant of the ID-correlation protocol, described in the sequel. The protocol is initiated by the D-node $D_1$ storing and sending a message to the combined ID-node with the message identifier consisting of a locally generated nonce (e.g., a time stamp or a serial number), the identifier of $D_1/Out_1$ in $DPN_1$, the identifier of $D_2/Out_2$ in $DPN_2$, and the indexes of $DPN_1$ and $DPN_2$. The message contains a user identifier in $DPN_1$. Along with the message, the D-node $D_1$ also locally stores the recovered data profile in $D_1/Out_1$ and an identifier of the authorized user. The combined ID-node then recovers from the received user identifier all equivalent identities of the same user in $DPN_2$ and sends them to the PID-node in $DPN_2$. As in the ID-correlation protocol, the PID-node recovers the (candidate) pseudonym(s) corresponding to the equivalent user identities for all DSs in $DPN_2$ and then sends the message with the same message identifier to each DS in $DPN_2$ by substituting the recovered (candidate) pseudonym(s) for the originally sent user identifier in the message content.

By forwarding the received message to the neighboring D-nodes in $DPN_2$, each DS then initiates the forward flooding phase of the protocol with the objective to send the message identifier, together with the current input pseudonym for the same user, to the destination output node $D_2$. Accordingly, similarly as in the ID-correlation protocol described above, each D-node different from $D_2$ proceeds by forwarding the message with the modified content in which the received (candidate) input pseudonym(s) is/are replaced by the corresponding output pseudonym to the subsequent neighboring D-nodes in $DPN_2$. When the message reaches $D_2$ via one of the inputs, $D_2$ finds the data record, if it exists, by using the received input pseudonym or candidate input pseudonyms and extracts the data profile from the specified output $Out_2$, substitutes this profile for the received pseudonym(s) in the message content, and sends this message to $D_1$ (e.g., directly, by using a common communications network such as the Internet). $D_1$ recovers the previously stored data profile from $D_1/Out_1$ by using the received message identifier, appends the received data profile from $D_2/Out_2$, and then sends the joint data profile to the requesting authorized user. Alternatively, instead of the forward flooding, D-nodes in $DPN_2$ can use the routing tables (with appropriate locators) to forward the message to only one of the subsequent neighboring D-nodes, instead of all of them, like the common routing protocols in standard communications networks.

If the requested data profile in $DPN_1$ is specified by a pseudonym, then the corresponding pseudonyms in $DPN_2$ can be recovered by a variant of the PID-correlation protocol described in the sequel. The backward phase of the protocol consists of backtracking starting from $D_1$, which stores and sends an initiating message backwards through at least one input channel (e.g., all of them) providing the input data contributing to the requested data profile in $D_1/Out_1$. As above, the message identifier consists of a locally generated nonce (e.g., a time stamp or a serial number), the identifier of $D_1/Out_1$ in $DPN_1$, the identifier of $D_2/Out_2$ in $DPN_2$, and the indexes of $DPN_1$ and $DPN_2$. Along with the message, $D_1$ also locally stores the recovered data profile in $D_1/Out_1$ and an identifier of the authorized user. The difference is that the message now contains the input pseudonym corresponding to a chosen input instead of a user identifier for specifying a data profile in $D_1/Out_1$. It should be noted that all the input pseudonyms can be recovered from any input or output pseudonym uniquely specifying the data profile in $D_1/Out_1$.

As in the PID-correlation protocol, in the backtracking process, any reached previous D-node forwards the message backwards to at least one previous D-node connected to that D-node, each time substituting the corresponding current input pseudonym for the received input pseudonym in the message, until, ultimately, the message reaches at least one input D-node, which receives at least one input from a DS in $DPN_1$. This input D-node then recovers from the found data record the corresponding input pseudonym $PID_{in}$ received from that DS as the last output pseudonym $PID_{out}$ sent out by the DS and generated by the PID-node (for the respective user). At the end of the backward phase, any such input D-node sends a message with the same message identifier containing a pseudonym ($PID_{out}$) to the PID-node in $DPN_1$, either directly or through the respective DS. Now, as in the PID-correlation protocol, the PID-node either recovers (in the case of storage) or reproduces (in the case without storage) the corresponding ID and sends it to the combined ID-node, which then recovers from the received ID all equivalent identities of the same user in $DPN_2$ and sends them to the PID-node in $DPN_2$. The forward phase of the protocol in $DPN_2$ is then the same as described above.

In another embodiment, an output D-node of $DPN_1$ may, at a given time, wish to merge a subset of data profiles (e.g., all of them) stored at one or more of its outputs with the subset of data profiles corresponding to the same users stored at one or more outputs of a specified output D-node of $DPN_2$. The subset of data profiles in $DPN_1$ is specified by pseudonyms. Then each corresponding pseudonym in $DPN_2$ can be individually recovered by the variant of the PID-correlation protocol described above. To this end, each created message identifier should contain a different nonce. Since the nonces effectively play the role of new pseudonyms created for merging or exchanging the data profiles of the D-nodes in $DPN_1$ and $DPN_2$, they can introduce undesired temporal linkability of the exchanged data profiles, especially if the data profiles of the same subsets of (anonymous) users are repeatedly merged, e.g., if the data profiles of all the users are merged. Consequently, the nonces should preferably be generated randomly or pseudorandomly as one-time pseudonyms.

In yet another embodiment, instead of recovering the pseudonyms and data profiles individually, one after another, it is simpler to do this jointly by using a list of pseudonyms and nonces as a whole. More precisely, let $PID_1$ and $PID_2$ denote generic pseudonyms in $D_1/Out_1$ of $DPN_1$ and $D_2/Out_2$ of $DPN_2$, respectively, and let $\{PID_1'\}$ and $\{PID_2'\}$ denote the corresponding subsets of pseudonyms at the origin of pseudonym chains in $DPN_1$ and $DPN_2$ ending with $PID_1$ and $PID_2$, respectively. Let PID' denote a generic nonce as one-time pseudonym used for merging the data profiles. $D_1$ then prepares the initial form of a joint message with the message identifier comprising the identifier of $D_1/Out_1$ in $DPN_1$, the identifier of $D_2/Out_2$ in $DPN_2$, and the indexes of $DPN_1$ and $DPN_2$. The message contains a list $\{(PID_1, PID')\}$, where each $PID_1$ uniquely specifies a data profile, $Data_{out,1}$, in $D_1/Out_1$ of $DPN_1$ and PID' is a randomly or pseudorandomly generated one-time pseudonym. Then $D_1$ prepares the final form of the message containing the list $\{(\{PID_1'\}, PID')\}$, which is obtained by substituting $\{PID_1'\}$ for $PID_1$, for each $PID_1$, where $\{PID_1'\}$ is obtained by the backtracking process, either from DSs or directly from the corresponding input D-nodes in $DPN_1$.

$D_1$ sends the message with the list $\{(\{PID_1'\}, PID')\}$ to the PID-node in $DPN_1$. For each $PID_1'$, the PID-node either recovers (in the case of storage) or reproduces (in the case without storage) the corresponding ID and sends it to the combined ID-node, which then recovers from the received ID all equivalent identities of the same user in $DPN_2$ and sends them the PID-node in $DPN_2$. The PID-node then generates the corresponding subset $\{PID_2'\}$ and initiates the forward flooding process in $DPN_2$ which ultimately results in the input pseudonym $PID_2$ received by $D_2$ together with PID'. $D_2$ then recovers the data profile in $D_2/Out_2$ by using $PID_2$ and associates this data profile, $Data_{out,2}$, with the received PID' corresponding to $PID_2$. $D_2$ can thus prepare a file containing $\{(PID', Data_{out,2})\}$ and sends this file to $D_1$.

$D_1$ can then merge $Data_{out,2}$ with $Data_{out,1}$ by using the same PID', for each PID'. If merging the data profiles is mutual, then $D_1$ sends $\{(PID', Data_{out,1})\}$ to $D_2$, which can then merge the data profiles analogously.

The present invention has been here described in terms of some possible embodiments thereof. Those skilled in the art will readily understand that several modifications and different embodiments are possible, without departing from the protection scope defined in the appended claims.

The invention claimed is:

1. A dynamic pseudonymization method for a data profiling network that includes a data node configured to receive input data related to users and to transform said input data into an output user data profile related to the users, said data node comprising user data records that store input data related to the users together with dynamic input pseudonyms of the users, and said data node configured to compute said output user data profile related to a user from said input data and to store the computed output data profile in said user data records thereof, the method comprising:

receiving, at said data node, a new input data related to the user along with an associated new user pseudonym and an old user pseudonym that was associated with a previously received input data related to the user in the past, or a set of candidate old user pseudonyms, the new input data received from at least one data source node of the data profiling network, or from at least one other data node of the data profiling network;

first searching, in said data node, for a user data record corresponding to the received new input data as said user data record having stored therein a dynamic input user pseudonym equal to the old user pseudonym received together with the new input data or to one user pseudonym belonging to the received set of candidate old user pseudonyms;

storing the new input data in the user data record found in the first searching;

setting the dynamic input user pseudonym, stored in said user data record of said data node, to be equal to a last received new user pseudonym associated with the received input data related to the user;

ascertaining, by said data node upon when user data record is not found in the first searching that includes the old user pseudonym received along with the new input data or the one user pseudonym received along with the new input data, whether a user data record corresponding to the user already exists, and computing, at given times, said output user data profile by:

using the new input data accumulated in said user data record;

storing the computed output user data profile in said user data record; and then erasing said accumulated new input data from said user data record, wherein the data profiling network includes at least one pseudonymization node configured to:

receive, from the at least one data source node, user identities that identify the user in the at least one data source node, the user identities comprising one or more identifiers of the users known to the at least one data source node;

generate user pseudonyms from the received user identities; and provide to the at least one data source node the generated user pseudonyms, said user data record is configured to store input data related to the user received from at least one other data source in the past, and the ascertaining comprises exploiting the old user pseudonym or the set of candidate old user pseudonyms received along with the new input data, and performing a forward flooding process that includes:

sending, by said data node forward to all other data nodes connected to the at least one pseudonymization node, a request that includes equivalent pseudonyms of the user;

second searching, by said data node when inputs of said data node receives one or more requests that include equivalent pseudonyms from at least one other data node connected thereto, for said user data record storing one of the received equivalent pseudonyms as input user pseudonyms;

using, by said data node when said user data record is found in the second searching and said data node is said data node receiving the new input data, the found user data record for storing the received new input data; and continuing the forward flooding process, when said user data record is found in the second searching and said data node is different from said data node receiving the new input data, by sending forward an output user pseudonyms stored in said user data record to all the other data nodes connected to the output of said data node.

2. The method of claim 1, further comprising: generating and storing, by said data node in said user data record, a dynamic output user pseudonym together with the computed output user data profile; and sending said output user data profile to at the least one other data node in the data profiling network, to generate a new value of said dynamic output user pseudonym, substitute the new value of said dynamic output user pseudonym for a previously stored old value of said dynamic output user pseudonym, and send to the at least one other data node both the old and the new values of said dynamic output user pseudonym together with said output user data profile.

3. The method of claim 1, wherein the generated user pseudonyms are generated as random or pseudorandom values, or keyed values generated by a keyed function from user identities and a secret key.

4. The method at claim 3, wherein at least one pseudonymization node encrypts and authenticates the generated user pseudonyms to be provided to the at least one data source node.

5. The method of claim 3, wherein the generated random or pseudorandom user pseudonyms are stored at the at least one pseudonymization node in association with the corresponding user identities.

6. The method of claim 1, wherein the user identities are different for different data source nodes, and the method further comprises providing, in the data profiling network, at least one equivalent user identities managing node that manages as equivalents different identities of a same user corresponding to different data sources source nodes.

7. The method of claim 6, wherein when the new input data is received by said data node from the at least one data source node, said ascertaining further comprises:

sending, by said data node, backwards a request to the at least one data source node for obtaining equivalent pseudonyms of the user, said request including the old user pseudonym or the set of candidate old user pseudonyms;

controlling the at least one data source node to recover the user identity temporarily stored therein, send the recovered user identity to the equivalent user identities managing node, and request to the equivalent user identities managing node to provide the equivalent identities of the user to the at least one pseudonymization node; and controlling the at least one pseudonymization node to retrieve the equivalent pseudonyms of the user and then send them to the at least one data source nodes connected thereto.

8. The method of claim 6, wherein when the new input data is received by said data node from the at least one other data node, said ascertaining comprises performing a backtracking process, an equivalent pseudonyms recovery process, and the forward flooding process, the backtracking process comprising:

sending, by said data node, backwards a request to the at least one other data node for obtaining equivalent pseudonyms of the user, said request including the old user pseudonym or the set of candidate old user pseudonyms;

controlling the at least one other data node to search for said user data record storing one of the received old user pseudonyms as output user pseudonym and then send backwards at least one request to any other data nodes connected to the at least one data node inputs, said request including the input user pseudonym stored in the said user data record;

searching, by said data node when an output of a data node in the data profiling network receives a request from any other data node connected thereto, for said user data record storing the received user pseudonym as output user pseudonym and then send backwards at least one request to any of the other data nodes or any data source nodes connected to said data node inputs, said request including the input user pseudonym stored in said user data record; and when an output of a data source node in the data profiling network receives a request from any data node connected thereto, controlling the data source node to forward the received user pseudonym to the at least one pseudonymization node with a request to provide the equivalent pseudonyms of the user; and the equivalent pseudonyms recovery process comprising controlling the at least one pseudonymization node to receive, from said data source node, a user pseudonym and then retrieve the equivalent pseudonyms of the user, either directly by using a stored table of pseudonyms or indirectly by using an invertible keyed function to recover the user identity, then send the user identity to the equivalent user identities managing node to provide the equivalent identities of the user, then generate candidate equivalent pseudonyms of the user from the received equivalent identities of the user, and then send them to the data source nodes connected thereto.

9. The method of claim 7, further comprising: creating, by said data node when the user data record corresponding to the received new input data is not found even after receiving the equivalent user pseudonyms, a new user data record in respect of the user, and storing the received new input data therein together with the received new user pseudonym received along with the received new input data.

10. The method of claim 1, wherein the generated user pseudonyms are dynamically changed after a predetermined time depending on a validity time period of the user data profile.

11. The method of claim 1, wherein the at least one data node and the at least one data source node are prevented from assigning, using or storing, in association with data related to the user, static user pseudonyms that do not change in time or old values of dynamic user pseudonyms generated and used in the past for the user.

12. The method of claim 1, wherein the data profiling network further comprises at least a first and a second disjoint data profiling networks, each disjoint data profiling network comprising respective data nodes, respective data sources providing input data on the basis of which user data profiles are calculated by said data nodes, respective pseudonymization nodes for generating user pseudonyms from user identities, and a combined equivalent user identities managing node configured to manage as equivalents different identities of a same user corresponding to different data sources in the first and second data profiling networks, the combined equivalent user identities managing node being exploited for retrieving user data profiles of the user in the second data profiling network when data profiles of said user are requested through the first data profiling network.

13. A dynamic pseudonymization method for a data profiling network that includes at least one data node configured to receive input data related to users and to transform said input data into an output user data profile related to the users, said data node comprising user data records that store input data related to the users together with dynamic input pseudonyms of the users, and said data node configured to compute said output user data profile related to a user from said input data and to store the computed output data profile in said user data records thereof, the method comprising:

receiving, at a data node of the at least one data node, a new input data related to the user along with an associated new user pseudonym and an old user pseudonym that was associated with a previously received input data related to the user in the past, or a set of candidate old user pseudonyms;

searching, in said data node, a user data record corresponding to the received new input data as said user data record having stored therein a dynamic input user pseudonym equal to the old user pseudonym received together with the new input data or to one user pseudonym belonging to the received set of candidate old user pseudonyms;

storing the new input data in the found user data record;

setting the dynamic input user pseudonym, stored in said user data record of said data node, to be equal to a last received new user pseudonym associated with the received input data related to the user;

computing, at given times, said output user data profile by:

using the new input data accumulated in said user data record;

storing the computed output user data profile in said user data record; and then erasing said accumulated new input data from said user data record;

generating and storing, by said data node in said user data record, a dynamic output user pseudonym together with said computed output user data profile;

sending said output user data profile to at least one other data node in the data profiling network, to generate a new value of said dynamic output user pseudonym, substitute said new value of said dynamic output user pseudonym for a previously stored old value of said dynamic output user pseudonym, and send to said at least one other data node both the old and the new values of said dynamic output user pseudonym together with said output user data profile;

when a user data profile requesting entity includes a request to retrieve user data profile stored in the at least one data node:

controlling the user data profile requesting entity to send a user data profile request to a selected one among the at least one data node of the data profiling network, wherein the user data profile data request includes an identifier of said data node that stores the requested user data profile to be retrieved, and a currently valid input or output user pseudonym respectively stored in said user data record of said selected one among the at least one data node to which the user data profile data request is sent;

retrieving, by said data node when said selected one among the at least one data node receiving the user data profile request is said data node storing the requested user data profile, the requested user data profile stored in said user data record in association with a specified currently valid input or output user pseudonym, and providing, by said data node, to the user data profile requesting entity the retrieved user data profile; and when said selected one among the at least one data node receiving the user data profile request is not said data node storing the requested user data profile:

a) controlling said selected one among the at least one data node to identify, in said user data records stored therein, the output user pseudonym corresponding to the received currently valid output user pseudonym included in the received user data profile request or the output user pseudonym corresponding to the received currently valid input user pseudonym included in the received user data profile request, and to send forward the retrieved output user pseudonym to all further other data nodes connected thereto; and b) repeating step a) by using the received retrieved output user pseudonym instead of said currently valid output user pseudonym or said currently valid input user pseudonym, until said data node storing the requested user data profile is reached and, then, having said data node retrieve the requested user data profile stored in the corresponding user data record.

14. The method of claim 13, further comprising: a prior operation of controlling the user data profile requesting entity to request, from at least one pseudonymization node, a currently valid input pseudonym of the user corresponding to a given temporary or permanent user identifier included in said user data profile request.

* * * * *